(12) United States Patent
Spitzer et al.

(10) Patent No.: US 9,381,708 B2
(45) Date of Patent: Jul. 5, 2016

(54) OPTIMIZED PREFORM FEED

(71) Applicant: Krones AG, Neutraubling (DE)

(72) Inventors: Thomas Spitzer, Wiesent (DE); Wolfgang Schoenberger, Brennberg (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 14/105,358

(22) Filed: Dec. 13, 2013

(65) Prior Publication Data

US 2014/0167334 A1    Jun. 19, 2014

(30) Foreign Application Priority Data

Dec. 14, 2012 (DE) .......................... 10 2012 024 420

(51) Int. Cl.
*B29D 22/00* (2006.01)
*B29C 49/42* (2006.01)
*B29C 49/78* (2006.01)
*B29C 49/06* (2006.01)

(52) U.S. Cl.
CPC .......... *B29D 22/003* (2013.01); *B29C 49/4205* (2013.01); *B29C 49/78* (2013.01); *B29C 49/06* (2013.01)

(58) Field of Classification Search
USPC ....................................................... 264/523
See application file for complete search history.

(56) References Cited

U.S. PATENT DOCUMENTS

| 3,590,982 | A  | * | 7/1971 | Banyas ...................... 198/470.1 |
| 7,054,710 | B2 |   | 5/2006 | Hartmann et al. |
| 7,556,137 | B2 | * | 7/2009 | Charpentier .................. 198/395 |
| 2004/0193304 | A1 | * | 9/2004 | Hartmann et al. ............ 700/157 |

FOREIGN PATENT DOCUMENTS

| CN | 2438564 Y | 7/2001 |
| CN | 2009 77723 Y | 11/2007 |
| CN | 2012 68093 Y | 7/2009 |
| DE | 3 150 183 C1 | 6/1983 |
| DE | 3622980 A1 | 1/1987 |
| DE | 19650626 A1 | 6/1998 |
| DE | 29908036 U1 | 10/1999 |
| DE | 29908036 U1 | 12/1999 |
| DE | 102006025010 A1 | 11/2007 |
| DE | 20 2008 014 367 U1 | 2/2009 |

(Continued)

OTHER PUBLICATIONS

Bimba Mead, Pneumatic Application & Reference Handbook. Published Jan. 2012 pp. 21-41.*

(Continued)

*Primary Examiner* — Jacob Thomas Minskey
(74) *Attorney, Agent, or Firm* — Dennemeyer & Associates, LLC

(57) ABSTRACT

A device for transporting plastic preforms to a stretch blow molding machine comprising a feeder device, which transports the plastic preforms to a separating device, which is arranged in transport direction upstream of the stretch blow molding machine, wherein the feeder device comprises a pneumatically actuable blocking device, which in a first position deblocks the path of transport for the preforms and in a second position blocks the path of transport for the plastic preforms, and wherein the blocking device is actuable by means of a cylinder. According to the invention, the valve for controlling the cylinder is arranged in the immediate vicinity of the cylinder.

15 Claims, 5 Drawing Sheets

(56) References Cited

FOREIGN PATENT DOCUMENTS

| DE | 102008021527 A1 | 11/2009 |
|---|---|---|
| DE | 102009016593 A1 | 10/2010 |
| EP | 0237459 A1 | 9/1987 |
| EP | 2 098 356 A3 | 9/2009 |
| EP | 2213594 A1 | 4/2010 |
| EP | 2213594 A1 | 8/2010 |
| EP | 2284120 A2 | 2/2011 |
| EP | 2441563 A2 | 4/2012 |
| WO | 9507770 A1 | 3/1995 |
| WO | 2006/058512 A2 | 6/2006 |
| WO | 2006058512 A2 | 6/2006 |

OTHER PUBLICATIONS

Chinese Office action for CN 201310690362.3 dated Sep. 6, 2015.
Chinese Office action for application No. CN 201310690362.3, dated Apr. 28, 2016.

* cited by examiner

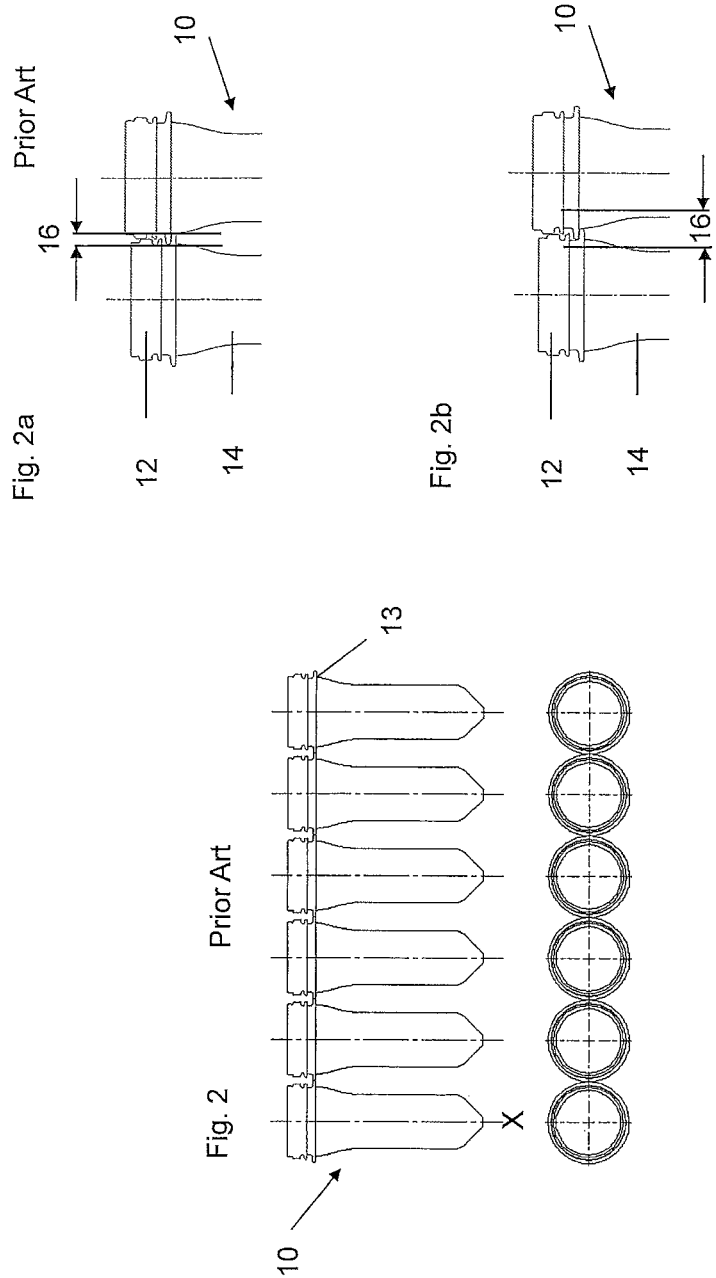

OPTIMIZED PREFORM FEED

The present invention relates to a method and a device for transporting plastic preforms to a stretch blow molding machine in which the preforms undergo a thermal conditioning process and are then stretched within a blow mold by a stretching rod and transformed into containers under the effect of blowing pressure. In today's stretch blow molding technology it is common to use so-called plastic preforms (made, for instance, of PP or PET), which are usually produced in a previous upstream process step, for instance in an injection molding process. Such plastic preforms comprise a closed bottom at one end and at the opposite end a mouth opening, which forms the opening end portion of the preforms. Each plastic preform is already formed with a mouth that essentially corresponds to the future opening of the finished container. Advantageously, this preform mouth section comprises a screw thread, which will enable closing the filled bottle with a screw cap, and a support ring or a transport groove, which serve for transporting the preform or the container during the production process. Such a screw thread as referred to here comprises at least one support ring and/or at least one retaining ring and/or at least one groove, which allow the preform to be gripped and/or guided from the exterior.

The preforms are typically fed to the stretch blow molding machine using feeder rails along which the preforms glide with the preform mouths spatially oriented toward the top. Guiding and supporting the preforms is typically performed by means of support elements, which are arranged below the screw thread of the preforms.

The feeder rails are commonly arranged in an inclined position so that the preforms glide along the feeder rails due to the gravitational force acting on them.

In order to ensure a reliable feeding process of the preforms in blow molding machines with a high production capacity, relatively long feeder rails are employed, so that the dynamic pressure attained at the transfer point to the separating device arranged upstream from the heating device is sufficient to counteract the frictional forces acting on the preforms while they are moved along the feeder or guide rails. A high dynamic pressure is also required in order to be able to quickly close gaps in the feeder device, said gaps resulting from disruptions, for instance, from jammed preforms being ejected.

It is furthermore already known for feeder rails to be horizontally arranged in order to transport very small and lightweight preforms, and for a suitable drive means, for instance an airstream, to be provided in order to accordingly propel the preforms. Such an arrangement is known, for instance, from WO 2006/058512 A2.

Should a disruption occur in the blow molding machine or in another machine arranged downstream from the blow molding machine, the transport of the plastic preforms to the blow molding machine is also stopped, in particular in the instance of a spatially and constructionally integrated facility that has functionally synchronized operations.

This is effected by means of a blocking finger that is provided at the end of the feeder rail and arranged immediately before the separating device, said separating device being provided, for instance, in the form of a sawtooth star wheel, which is used for separating the preforms and arranging them at a defined distance from each other so that said blocking finger can be inserted between the mouths of two adjacent preforms, thus stopping the stream of preforms until the machine is back to operating.

This procedure for stopping a stream of preforms has been known for a long time, but it reaches its limits with increasing machine speeds and leads more and more often to problems with the blocking finger being too slow to be properly inserted on time between two mouths and hitting one of the preform mouths instead, thereby deforming or even impaling the preform mouth. The blocking finger or the feeder rail may even be damaged as a result.

By the dynamic pressure produced in the feeder rail, the preforms are arranged one immediately after the other and they can therefore not swerve forward or backward when the blocking finger is inserted. The range of movement for the preforms is furthermore delimited laterally by the feeder rail, which is arranged immediately below the support ring.

Such problems inevitably slow down production, as they require the operator to take appropriate action in order to remove the respective problem. Machine effectiveness is also impaired by such problems.

The task of the present invention is therefore to reliably block the path of transport of the preforms, in particular in the high performance range.

It is furthermore the task of the invention to enable failure-free re-start of machine operation with repeatable accuracy.

These tasks are achieved by the methods and devices according to the independent claims. Advantageous embodiment variants and advancements are subject to the subclaims.

A device according to the invention for transporting plastic preforms to a stretch blow molding machine comprises a feeder device, which transports the plastic preforms to a separating device, which is arranged in transport direction upstream of the stretch blow molding machine, wherein the feeder device comprises a pneumatically actuable blocking device, which in a first position deblocks the path of transport for the preforms and in a second position blocks the path of transport for the plastic preforms, and wherein the blocking device is actuable by means of a cylinder, and the valve for controlling the cylinder is arranged in the immediate vicinity of the cylinder.

The phrase "arranged in the immediate vicinity" refers to the cylinder and the appropriate valve being located immediately adjacent to each other or, advantageously, the cylinder and the valve even being accommodated in a joint housing, forming a cylinder valve unit.

It is thus possible to space the cylinder and valve so close to each other that the pneumatic connection between valve and cylinder is extremely short. In prior art, on the other hand, pneumatic supply lines are long and have to be supplied with unnecessary amounts of air, thereby creating dead space.

Furthermore, "in the immediate vicinity" may refer to the cylinder and the valve being in a predefined position next to each other and preferably attached to each other in that position.

It is advantageous for the pneumatic connection between the cylinder and the valve to be shorter than 30 centimeters, preferably shorter than 20 centimeters, and, in a particularly preferred embodiment, shorter than 10 centimeters.

The pneumatic connection may even be shorter than 5 centimeters, as the intention is to avoid as much dead space as possible. As far as possible, there will be no tubes at all for forming the pneumatic connection between the cylinder and the valve, but the pneumatic connection will rather be formed solely by arranging these two components immediately adjacent to one another.

Preferably, the cylinder and the valve are arranged together in a housing, forming a so-called cylinder valve unit. Such an arrangement enables easy installation and maintenance of these two components. Quicker reaction times and shorter takt times are further advantageous results.

The blocking device is preferably inserted between two adjacent preform bodies. In another preferred embodiment variant, the blocking device is inserted between the mouths of the preforms, in particular laterally, as is known from prior art, i.e. in perpendicular to the plane formed by the longitudinal axes of the preforms. The blocking device may alternatively be arranged so that it is inserted into the preform in the direction of the longitudinal axis of the preform through the opening at the top of the preform mouth.

In an advantageous embodiment variant, the feeder device supports the plastic preforms in the process of guiding them. The support may be formed in such a manner that the plastic preform comprises a groove with which the feeder device can engage, this groove being arranged, for instance, in the section of the preform mouth, or the support may be formed in such a manner that a projection is provided in the section of the preform mouth, for instance in the form of a retaining ring or a support ring, which rests on the feeder device or which is enclosed by the feeder device.

It is also conceivable that the preform rests on the feeder device supported and thus guided along solely by its contour, which may be formed like a V, for instance.

The feeder device may furthermore be formed by rollers, rails, wires, tunnels, or other similar elements that enable the preforms to be guided along. It is also conceivable that the preforms are only supported by only one rail on only one side. For this purpose, the preforms could be transported in an inclined position.

Furthermore, the blocking device is advantageously arranged at that side of the feeder device at which it is possible to create a larger gap between two consecutive preforms when the blocking device is inserted between these two preforms. This side may in particular be a support surface. It is in particular possible to create the larger gap in a perpendicular direction below this support surface.

The feeder device is preferably arranged in such a manner that the mouth of the preform is located above the feeder device and the preform body is located below the feeder device.

The mouth of the preform is accordingly arranged on one side of the feeder device, preferably above it, and the preform body on the other side of the feeder device, preferably below it.

The side as described above may be located, for instance, below the feeder rail, provided that the longitudinal axis of the preform is arranged essentially in perpendicular to the horizontal plane and provided that the preforms are supported by the feeder rail in the section of their mouths.

It is also conceivable to transport the preforms essentially in parallel to the horizontal plane.

A larger gap can be created on that side of the preform on which the walls of the preforms are further apart from each other due to their contour and/or on that side on which the preforms can be moved further apart by inserting the blocking finger. Provided that the preforms are guided along at their screw thread section, this larger gap can be created, for instance, below the feeder device, because the preforms are very limited in their movements in the section of their mouths by the rails and by the other preforms that are immediately adjacent to them due to the exerted dynamic pressure. Below the rail, on the other hand, there is either no guidance on the sides or only a guidance provided at certain intervals to prevent the preforms from tumbling, and the preform bodies are also not arranged immediately abutting on each other.

It is furthermore advantageous for the blocking finger to be arranged below the feeder device, but nevertheless above the center of mass of the preforms.

The preform diameter is commonly larger in the section of the preform mouths than in the section of the preform bodies. When two preforms are transported with their longitudinal axes in parallel to each other and the dynamic pressure causes them to come into contact with each other, the distance between their outer surfaces will be smaller in the section of their mouths than in the section of their bodies.

In a preferred embodiment variant, the valve is arranged decentralized in relation to a central distribution unit, which comprises at least two further valves.

The term "decentralized" in this context is to be understood as meaning that the valve for controlling the blocking finger is arranged in a different location, and not, as known from prior art, together with other valves on the central distribution unit, for instance on a central ASI valve terminal. This is, in particular, in a location separate from the central distribution unit. It is preferably provided for the valve to be arranged in the vicinity of the appropriate cylinder, and in a particularly preferred embodiment, the valve and the cylinder form a cylinder valve unit so that the two components can be optimally linked to each other. The optimal link can be attained by the pneumatic connection being designed as short as possible. Long pneumatic supply lines between valve and cylinder create dead time, while short supply lines achieve a dead time approaching zero.

The term "decentralized" is furthermore to be understood as meaning that the electric lines for controlling this valve run in parallel to the supply lines for the central distribution unit or in parallel to the supply lines for the other valves. This valve accordingly has its own pneumatic supply as well as its own electric supply and information provision.

The described decentralized arrangement therefore offers the advantage of shorter reaction times due to an immediate signal transfer and a lower energy consumption, as the dead space with regard to the pneumatic supply lines tends toward zero.

The other valves of the central valve terminal may serve for controlling the distance between the rails, for instance when processing preforms with different diameters.

It is advantageous for a central signal processing unit to be directly connected to the valve via a bus system. The phrase "directly connected" in this context is to be understood as meaning that there are no other components intended between the valve and the central signal processing unit apart from cables that conduct the signal for controlling the valve to this valve. It thus becomes possible to transfer the signal to its destination with as few delays or as little dispersion as possible and thereby to achieve a high level of repeat accuracy for switching the blocking finger.

In another advantageous embodiment variant, the central signal processing unit is equipped with a separate output card, which is directly connected to the valve by a connection means, for instance an electric cable.

No bus systems are needed at all in such an arrangement so that the signal will arrive at its destination even faster.

A further device according to the invention for transporting plastic preforms to a stretch blow molding machine which solves the above described task comprises a feeder device, which transports the plastic preforms, each comprising a mouth and a body section, to a separating device, said separating device being arranged upstream in the direction of transport from the stretch blow molding machine, wherein the feeder device comprises an actuable blocking device, which in a first position deblocks the path of transport for the plastic preforms and in a second position blocks the path of transport for the plastic preforms. According to the invention, the blocking device is inserted between two consecutive plastic preforms in the area of the preform body sections.

The term "mouth" of a preform in this context is to be understood as referring to that end of the preform that comprises an opening, which is used at least for filling a finished blow-molded container or for inserting a stretching rod or for attaching a blowing nozzle to. Furthermore, the term "mouth" refers to that section of a preform that is not or only minimally deformed in later blow molding forming processes. During transport, the mouth section of the preform serves for gripping the preforms from the outside. This is made possible by a groove, for instance, which is located in or below a screw thread or above or below a support or retaining ring. Support or retaining rings that are arranged in the section of the mouth are also suited for interacting with according transport means. In prior art, the mouth section of the preform is also always that section that is not specifically warmed up in a heating device. It is also conceivable that the screw thread itself serves for transporting. The invention also allows using preforms that do not comprise screw threads.

The section of a preform that is warmed up in a heating device is the body section, which is warmed for the purpose of being subsequently formed in the blowing wheel, in particularly blow molded, in particularly stretch blow molded. The body section of a preform is furthermore that section which comprises a closed end, which is at least closed during or after the blow molding process, and in any case before filling the finished container.

The mouth section at least temporarily has an open end.

According to the invention, the preforms are either transported in such a manner that the longitudinal axes of the preforms are essentially in perpendicular to the horizontal plane or in such a manner that the longitudinal axes of the preforms are essentially in parallel to the horizontal plane. In a first variant, the preforms are preferably supported by feeder or guide rails that are arranged essentially horizontally wherein the gravitational force is used to cause the preforms to rest on the rails.

In a second variant, the guide rails may by arranged essentially vertically and preferably in a circular form in order to support the preforms in an essentially horizontal position by using the centrifugal forces together with the feeder or guide rail.

In a further device according to the invention for transporting plastic preforms to a stretch blow molding machine, a feeder device is provided for transporting the plastic preforms to a separating device arranged upstream in the direction of transport from the stretch blow molding machine, wherein the feeder device comprises at least two surfaces, with the first surface guiding the preform in a hanging position and the second surface supporting the preform from the side. Also provided is an actuable blocking device which in a first position deblocks the path of transport for the plastic preforms and in a second position blocks the path of transport for the plastic preforms, with the blocking device being arranged in a position averted from the first surface of the feeder device.

The phrase "in a hanging position" is understood as meaning that the preforms comprise a projection, such as a support ring or a retaining ring, or that they comprise a groove in or below their mouth section, said support ring, retaining ring, or groove being suited to interact with a first surface of the feeder device in such a manner that the preforms are guided on or by the feeder device. Here, either gravitational or centrifugal forces act on the preforms in such a manner that they come into contact with the feeder device in the section of the first surface of the feeder device. The lateral support surface is furthermore suited for supporting the preforms in the desired position in the direction of transport.

The side averted from the first surface is that side of the feeder device on which the preform does not rest and also the side which does not serve to laterally guide the preform.

While it is possible that the feeder device comes into contact with the preform on the averted side, the preform is, however, pressed to the first surface by gravitational or centrifugal force.

In an advantageous embodiment form, the blocking device is actuable pneumatically or electrically. Therefore, either a cylinder valve unit or an electric drive can be arranged at the blocking device for the purpose of actuating the blocking device.

In a method according to the invention for transporting plastic preforms to a stretch blow molding machine wherein the plastic preforms are transported by a feeder device along a path of transport to a separating device, a blocking device is provided, which is switched from a first position for deblocking the path of transport to a second position for blocking the path of transport. According to the invention, a signal for actuating the blocking device is conveyed from a central signal processing unit directly to a valve via a bus system or a connection means connected to a separate output card.

In a further method according to the invention for transporting plastic preforms to a stretch blow molding machine, a feeder device transports the plastic preforms, which each comprise a mouth and a body section, along a path of transport to a separating device. Furthermore, a blocking device is provided, which is switched from a first position for deblocking the path of transport to a second position for blocking the path of transport According to the invention, the blocking device is inserted between two consecutive preforms in the area of the preform body sections.

The blocking finger is moved essentially in perpendicular to a plane formed by the longitudinal axes of the preforms.

The blocking finger is advantageously inserted in a section between the feeder device and the middle of the entire length of the preform.

In a further preferred embodiment form, a device for transporting plastic preforms to a stretch blow molding device is provided with a feeder device, which transports the plastic preforms to a separating device arranged upstream in the direction of transport from the stretch blow molding machine. This feeder device comprises an actuable blocking device, which in a first position deblocks the path of transport for the plastic preforms and in a second position blocks the path of transport for the plastic preforms, with the blocking device being actuable by means of an electric drive. In this instance it is advantageous that electric drives enable rapid switching at a high level of repeat accuracy.

Arranged upstream of the feeder device according to the invention is always a sorting device for placing the preforms in rows and with their container necks facing upward.

Such a sorting device may be designed as a roller sorter or a disk sorter, for instance.

The feeder device according to the invention is either arranged at an angle to the horizontal plane, thus creating the required dynamic pressure by the preforms being arranged one after the other, or the feeder device is arranged horizontally and additionally equipped with a drive means for propelling the plastic preforms. The drive equipment may be provided in the form of an air blower or of a chain with drive pins. In the first instance, the end section of the feeder device can also be in a horizontal position.

In one method according to the invention for transporting plastic preforms, the plastic preforms are transported downstream from the separating device by a further transport device along a predefined transport path and warmed up by a heating device during this transport.

It is advantageous to provide a further heating device upstream from the sorting device, said further heating device bringing the unsorted preforms to a first temperature, which is below the temperature required for blow molding.

Advantageously, a treatment device is provided downstream from the heating device, which treatment device is employed for transforming the plastic preforms to plastic containers.

In this instance it is possible that the transport to the treatment device takes place immediately, but it is also possible to transport the plastic preforms to a different device first, for instance to a sterilizing unit, and then to the treatment device (i.e. in particular a blow molding machine).

The plastic preforms may be sterilized in the sterilizing unit while normal operation is under way, which may be effected, for instance, by means of electron radiation or also by means of a fluid sterilizing medium, for instance peracetic acid or $H_2O_2$ It is advantageous for the heating device to be part of an integrated facility and to operate synchronized with the machine arranged downstream on the transport path of the containers and without a transport buffer between the two devices.

Preferably, the machine arranged downstream from the heating device is an apparatus for transforming plastic preforms to plastic containers. Further machines may additionally be arranged downstream from this transforming device, such as sterilization devices, filling devices, and the like.

At least some of the sections of the device may, in particular, be arranged in a clean room. In order to maintain clean room conditions on the transport paths, it is possible to provide cleaning and/or sterilizing devices for cleaning and/or sterilizing the treatment elements and the clean room itself (the walls of the clean room) as well as providing devices for maintaining an overpressure in the clean room. The clean room preferably extends from the section where the filling machine is located and from where the preforms are sterile, at least on the inside, to the section where the molded and filled bottles are closed. If a preform manufacturing machine, in particular an injection molding machine for preforms, is arranged upstream from the heating device, the clean room may also already start here and extend through the heating device and the blow molding machine. In this instance, both the path for the normal operation and the recycling path after the grouping station may be arranged in particular entirely within the clean room. The paths may be provided with an enclosure. The ejection path or the path for rejects may either also extend through a lock to outside of the clean room or it may lead into an appropriately sized basin within the clean room.

Further advantages and advantageous embodiment variants are illustrated in the enclosed figures.

These show as follows:

DETAILED DESCRIPTION

Figure 1:
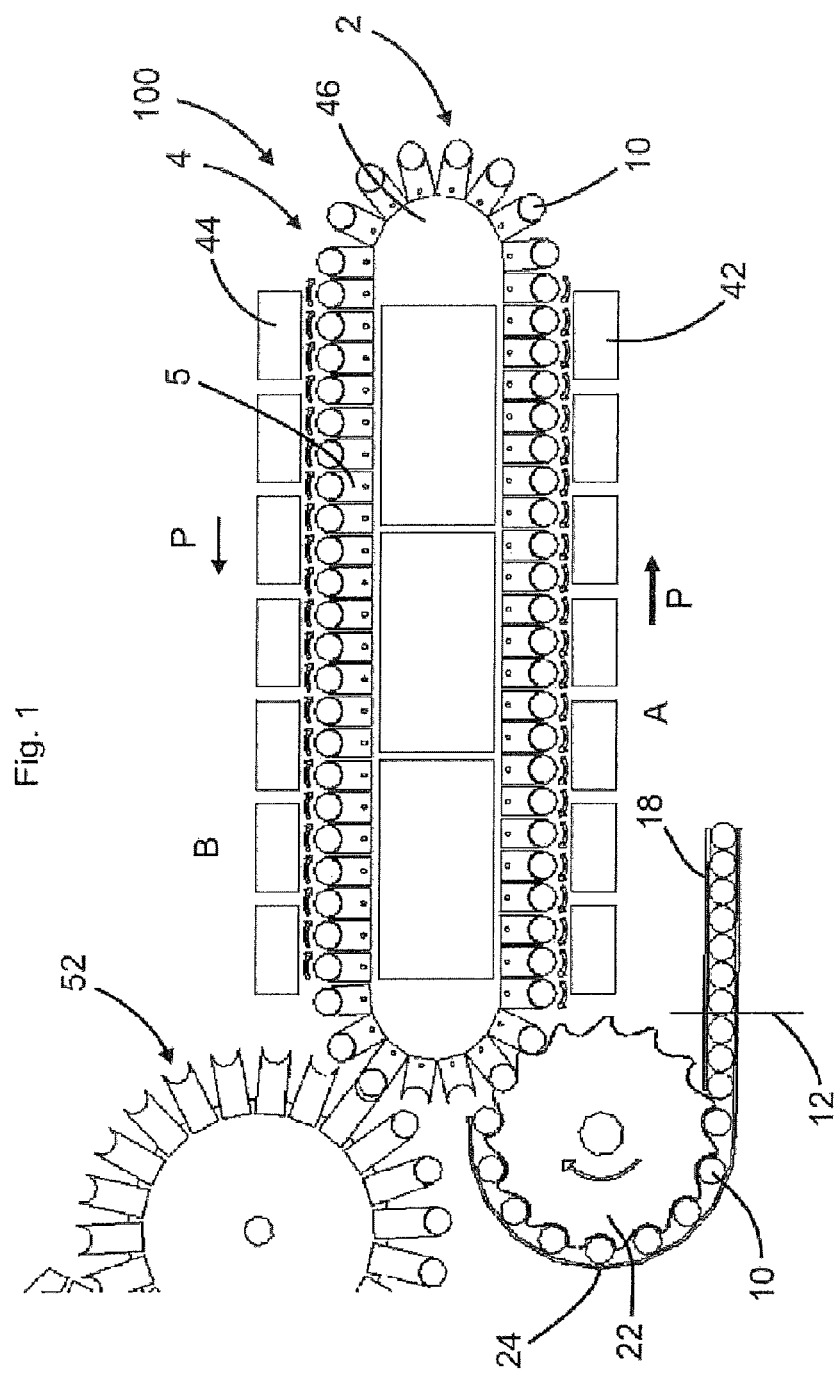
FIG. 1 A representation of a facility for treating plastic preforms as known from the prior art FIG. 2 A representation of a stream of plastic preforms FIG. 2a A representation of the insertion area of the blocking finger according to the prior art FIG. 2b A representation of the insertion area of the blocking finger according to the invention FIG. 3 A representation of the device according to the invention FIG. 4 A schematic representation of the interaction of the feeder device and the plastic preform FIG. 5 A representation of the cylinder valve unit according to the invention FIG. 6 A representation of the components that are required for signal transfer according to the prior art FIG. 7 A representation of the components that are required for signal transfer according to the present invention FIG. 8 A representation of the pneumatic control for the cylinder valve unit according to the invention

FIG. 1 shows an illustration of a device 1 for treating containers according to the prior art. This involves supplying unsorted plastic preforms 10 into a feeder device first, for instance a roller sorter, where they are sorted and aligned in order to be subsequently conveyed to the heating device 4 in a feeder rail 18, wherein they are separated and spaced apart at a defined distance as well as transferred to the heating device 4 by means of a sawtooth star wheel 22 at the end of the feeder rail 18. As an alternative to the sawtooth star wheel 22, the separating device may also be provided in the form of a separating screw.

The plastic preforms 10 are then conveyed in a conveying line or along a transport path P through a heating device 4, before they are further processed in a transforming device (not illustrated here), such as a blow molding station. Commonly, the plastic preforms 10 are injection molded parts, which are heated up to a transforming temperature in the heating device 4 and subsequently transformed to their final form in the blow molding device. Each plastic preform 10 is already formed with a mouth 12 that essentially corresponds to the future mouth opening 12 of the finished container.

The plastic preforms 10 are commonly held in the heating device 4 by means of a spindle that is pivotally journaled to a chain link. In this way it is additionally possible to rotate the plastic preforms 10 about their longitudinal direction.

As shown in FIG. 1, a multitude of chain links with the spindles journaled thereon is connected to each other, thus forming an endlessly circulating chain in the heating device 4. The reference character 5 here stands for an individual chain link. Arranged respectively at the straight longitudinal sides of the outer circle ring formed by the chains of the heating devices are heating elements 42, 44, which convey heat to the plastic preforms 10 by means of IR radiation.

It is alternatively possible to provide heating elements 42, 44, in particular circulating heating chambers or resonators without a chain, which convey heat to the plastic preforms 10 by means of microwave or laser radiation.

Located at the end of the heating device 4 is a transfer device, in particular a transfer star wheel 52, for transferring the preforms 10 to the blowing wheel. This transfer star wheel 52 is suited for separating the preforms 10 into the formation required for feeding the preforms 10 to the blowing wheel.

FIG. 1 further illustrates the blocking finger 20 provided at the end of the feeder rail 18, which blocking finger 20 is suited for stopping the stream of preforms 10 in the feeder rail 18 in the instance of the heating device 4 or other treatment devices located further downstream being stopped or not requiring any further preforms 10. For this purpose, the blocking finger 20 is inserted between the mouths 12 of two consecutive preforms 10.

According to the prior art, all plastic preforms 10 that are located upstream from this blocking device 20 in the sawtooth star wheel 22 or in the heating device 4 are removed by means of an ejecting device in the transfer star wheel 52 after empty runs or after restart of the heating device 4. The reference character 24 stands for a stationary enclosure, which serves for transporting the plastic preforms 10 through the sawtooth star wheel 22.

With machine performance constantly accelerating, the preforms 10 are being conveyed increasingly quicker through the entire machine and thus also increasingly quicker along the feeder rail 18. The intervals for the blocking finger 20 to be properly inserted into the gap 16 between two preform mouths 12 become shorter and shorter.

This leads to frequent problems with the blocking finger 20 missing the gap 16 and hitting the mouth 12 of a preform 10 instead and possibly deforming or even impaling the preform 10.

The present invention considerably reduces these problems by optimizing the employment of the blocking finger 20.

FIG. 2 illustrates a stream of preforms 10 as it may be formed under the dynamic pressure caused in the feeder rail 18.

The phrase "stream of preforms" in this context is to be understood as meaning that several preforms 10 are arranged one immediately after the other, in particular even abutting on one another. For this purpose, the required dynamic pressure can be produced by the feeder rail 18 being arranged in an inclined position (not illustrated here) so that the dynamic pressure is generated by the weight of the preforms 10 succeeding each other.

It is alternatively possible to arrange the feeder rail 18 essentially horizontally, with the dynamic pressure then being produced by a separate drive means (not illustrated here). The drive may preferably be effected by an airstream that pushes the preforms 10 toward the sawtooth star wheel 22.

As described above, the dynamic pressure pushes the preforms 10 as close together as possible and preferably so close that always two adjacent support rings 13 abut on each other. It may possibly happen, however, that two adjacent support rings 13 even come to be positioned on top of each other, thus perpetually reducing the gap 16 between two consecutive preform mouths 12, into which the blocking finger 20 is supposed to be inserted (see FIG. 2a).

With the gap 16 becoming so narrow and the machine performance, on the other hand, constantly increasing, the time left for the blocking finger 20 to be properly inserted into the gap 16 is perpetually reduced; for instance at a machine output of 80,000 containers per hour, the time left for the blocking finger 20 to be inserted into the gap 16 amounts to only approximately 5 milliseconds.

If very lightweight preforms 10 with very thin walls are used, there is the additional risk of the preform mouths 12 being deformed or impaled by the blocking finger 20. Also, in the instance of a preform 10 being hit by the blocking finger 20, there is no possibility of the preform 10 thus hit to swerve backward, forward or to the side, which is due to the feeder or guide rail 18 and to the fact that the preforms 10 are pushed together by the dynamic pressure so close as to be immediately adjacent to each other. In addition, the blocking finger 20 may get caught in the screw thread.

As can be seen in FIG. 2b, the gap 16 for the blocking finger 20 to be inserted between two consecutive preforms 10 in order to separate the two preforms 10 is considerably wider in the area of the preform body sections 14 than in the area of the preform mouth sections 12. By arranging the blocking finger 20 in such a manner that it can be inserted between the preform body sections 14, it is therefore possible to significantly increase the time interval for the blocking finger 20 to be inserted, and, in addition, the preforms 10 have more space to swerve at this point.

Figure 3:
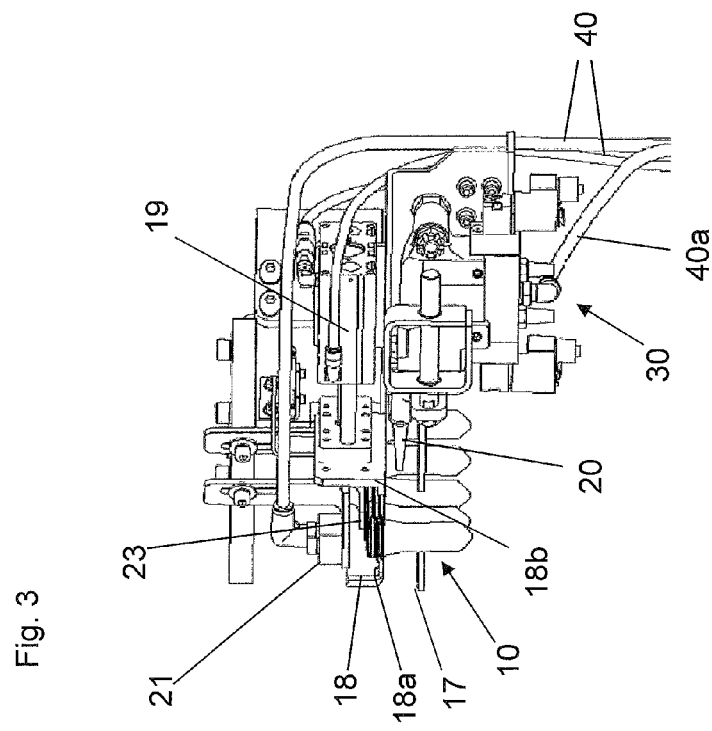

FIG. 3 shows the end of the feeder rail 18, which is the transfer area to the sawtooth star wheel 22, where the blocking finger 20 is arranged. The feeder rail 18 is formed by two parallel rail elements 18a, b. It is advantageous for the space between the two rail elements 18a, b to be smaller than the maximum diameter of the support ring 13 of the respective preform 10 so that the preforms 10 can be placed with their support ring 13 resting on the feeder rail 18 for being guided in that way. It is particularly preferable for the two rail elements 18a, b to be spaced at such a distance that the elements 18a, b are arranged as close as possible to the preform body 14, thus preventing the support ring 13 from inadvertently slipping through. Furthermore, in order to prevent the preforms 10 from being lifted out of the path of transport P or from becoming wedged into the feeder rail 18, a holding down device 23 is preferably provided, which is preferentially arranged at a small distance above the preforms 10, preferentially at less than 10 mm distance, and essentially in perpendicular to the longitudinal axes X of the preforms 10. A further guide means 17 is preferably provided, which is spaced apart from the preform bodies 14, and which prevents the preforms 10 from tumbling during the transport.

It is, however, also nevertheless possible that the preforms 10 have a larger range of movement in the section of their bodies 14 than in the section of their mouths 12 for shifting forward, backward, and to the side, as the mouths 12 are arranged one immediately abutting on the next one, and their movement is additionally limited by the feeder or guide rail 18.

In the instance of preforms 10 becoming wedged in the transfer area between the feeder rail 18 and the sawtooth star wheel 22, it is possible that the cylinder 19 moves the rail element 18b away from the rail element 18a, thus deblocking the jammed preforms 10 so that they fall out of the rail 18. In order to ensure that the jammed preforms 10 are reliably ejected, a pneumatic ejecting device 21 is also provided, which impinges the preforms 10 with compressed air from above.

FIG. 3 furthermore illustrates the cylinder valve unit 30, which actuates the blocking finger 20 with repeat accuracy. For this purpose, the blocking finger 20 is preferably arranged below the support ring 13 or below the feeder rail 18. Furthermore, the blocking finger 20 is arranged in such a manner that it can be operated essentially in perpendicular to a plane formed by two adjacent longitudinal preform axes X.

Figure 4:
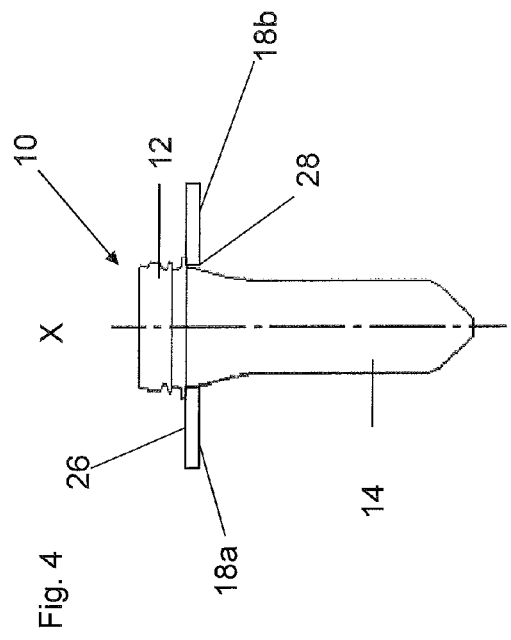

FIG. 4 continues to illustrate the interaction of a feeder or guide rail 18 (here rendered schematically) and a preform 10. This feeder or guide rail 18 comprises two rail elements 18a, b, on which the preform 10 is guided in a hanging position. Each of these rail elements comprises at least two surfaces wherein a first surface 26 is provided for guiding the preform 10 in a hanging position, and which first surface 26 is therefore arranged in perpendicular to the longitudinal axis X of the preform 10. This first surface 26 is furthermore in direct contact with a guiding surface of the preform 10, for instance with the bottom side of a support ring 13 or a retaining ring or with a comparable surface of a groove in the mouth section 12 of the preform 10. The second surface is arranged essentially in parallel to the longitudinal axis X of the preforms 10 and serves to laterally guide the preform 10 in the direction of transport. The surfaces are accordingly small if a wire, for instance, is used instead of the rail.

Figure 5:
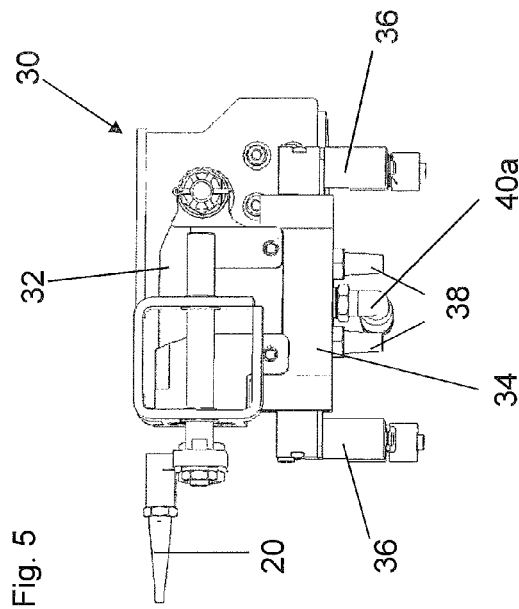

FIG. 5 shows a unit according to the invention comprising the blocking finger 20 and the cylinder valve unit 30, which is required for controlling the blocking finger 20.

This cylinder valve unit 30 is composed of the cylinder 32 and the immediately adjacent valve 34, which actuates the movement of the cylinder 32. Preferably, the valve 34 is arranged so close to the cylinder 32 that the dead space between the cylinder 32 and the valve 34, and also the length of the hose line connecting the cylinder 32 and the valve 34, are kept at a minimum. On the one hand, this allows to cut down on the compressed air used, and on the other hand the unit 30 can react very quickly.

Further arranged directly at the valve 34 and used for the control of the valve 34 are a pneumatic supply line 40a, which feeds compressed air to the valve 34, and magnetic coils 36, which convey electric signals. Characterized by the reference character 38, ventilation means for the valve 34 are also provided.

Figure 6:
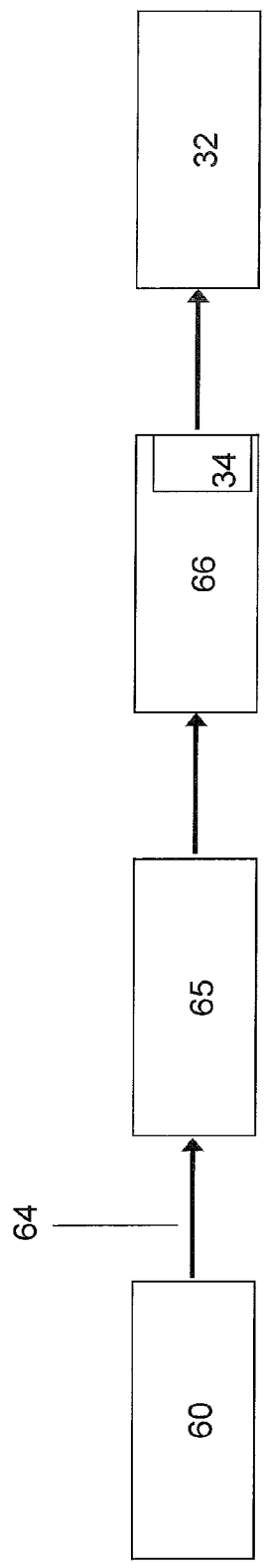

FIG. 6 furthermore schematically illustrates the transfer of the signal for controlling the blocking finger 20 according to the prior art. First, the signal for the position of the sawtooth star wheel 22 is processed, preferably in a CPU or central processing unit 60. From there, the signal is transferred via a first bus system 64, for instance a PROFINET bus system, to a second bus system 65, preferably an ASI module. Beside a master unit 65, the second bus system comprises among others a central distribution unit 66, for instance an ASI valve terminal with several valves arranged thereon. The signal is thus transferred from the master unit 65 to the central distribution unit 66. Among others, the valve 34 for controlling the cylinder 32 of the blocking finger 20 is arranged on this central distribution unit 66. This valve 34 is connected to the cylinder 32 by a long pneumatic supply line 40 (not illustrated here), which results in a considerable amount of dead space and is adversely time-consuming.

A further disadvantage lies, for instance, in that the valves on the ASI valve terminal 66 do not always switch precisely at the predefined point of time, but rather with certain dispersions of 5 milliseconds, for instance, thus resulting in a poor repeat accuracy. The magnet valve 34 as employed in the prior art for controlling the cylinder 32 of the blocking finger 20 also requires a certain amount of reaction time (app. 8 milliseconds).

Figure 7:
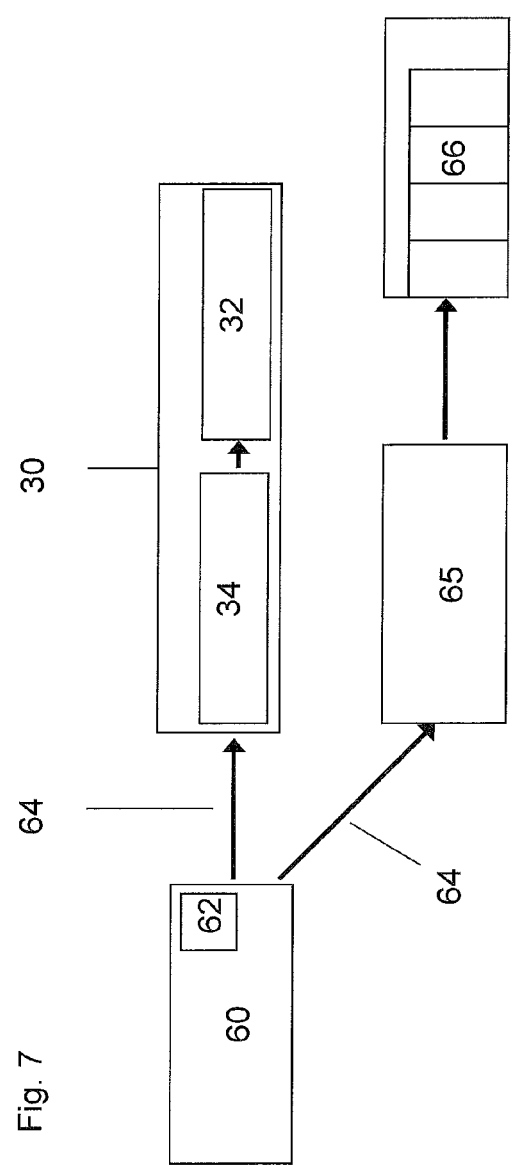

FIG. 7 illustrates the signal transfer for controlling the blocking finger 20 according to the invention.

In contrast to FIG. 6, the electric signal coming from the central signal processing unit 60 is transferred directly via a single bus system 64, preferably a PROFINET cable, to the valve 34 of the cylinder valve unit 30. This has the advantage that by decentralizing the signal chain and transferring the signal as directly as possible from the central distribution unit 66 to the cylinder valve unit 30, the repeat accuracy for switching the blocking finger 20 is significantly improved.

It is possible to further improve the signal transfer by conveying the signal from the central processing unit 60, for instance the CPU, via a separate output card 62 directly to the valve 34 of the cylinder valve unit 30. This type of transfer requires no bus system 64, but only an electric cable. In this way, the switching delays caused by the bus system 64 are also omitted, resulting in even further improved repeat accuracy and increased speed of the system.

The other valves that are required, among others, for ejecting the preforms 10 on entering the sawtooth star wheel 22, for instance as described above in the heating device 4, may still be arranged on an ASI valve terminal 66, which is controlled by two bus systems 64, 65, as described in FIG. 6. The control of the ASI valve terminal 66, in this instance, is effected in parallel to the control of the cylinder valve unit 30.

Figure 8:
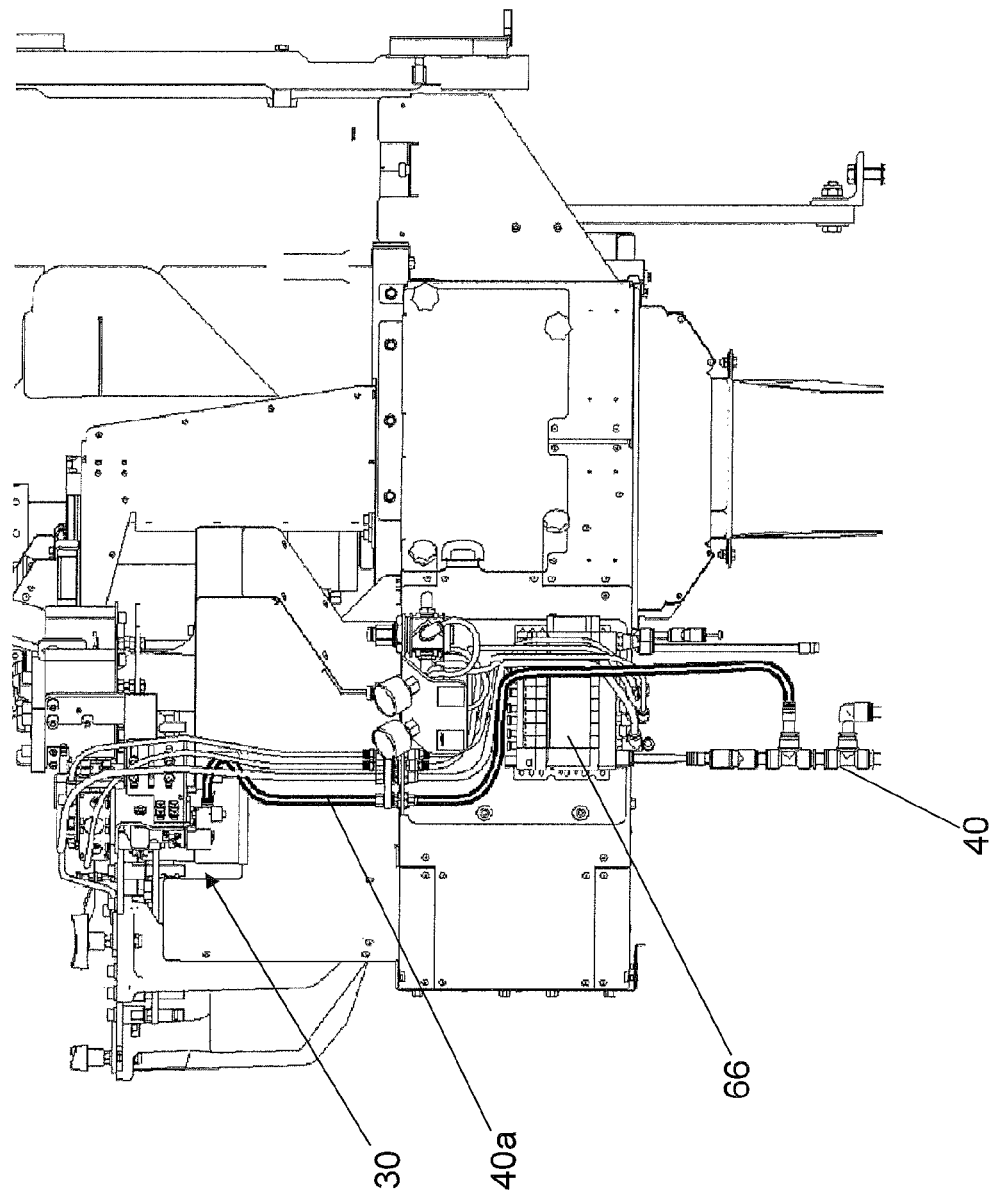

FIG. 8 represents the pneumatic control for the cylinder valve unit 30 according to the invention. Here, the compressed air that is required by the device 1 is conveyed to the device 1 through a pneumatic supply line 40. A pneumatic supply line 40a is provided for supplying compressed air to the cylinder valve unit 30, said pneumatic supply line 40a branching off before reaching the central distribution unit 66, which has several valves arranged on it. As the hose line between the valve 34 and the cylinder 32 is formed as short as possible by decentralizing the supply in this manner, the consumption of compressed air can be reduced. In addition, the cylinder valve unit 30 reacts considerably quicker, as it is no longer being influenced by the dispersions and delays caused by the central distribution unit 66.

On the central distribution unit 66, a valve may be provided, for instance, which serves to control the cylinder 19 for adjusting the feeder rail 18 (cf. FIG. 3). As the feeder rail 18 is only adjusted while the machine is not operating, it is not necessary for this adjustment to be effected with repeated accuracy or with particular speed.

The applicant reserves the right to claim all the features disclosed in the application documents as being essential to the invention, insofar as they are novel either individually or in combination as compared with the prior art.

LIST OF REFERENCE CHARACTERS

1 Stretch blow molding machine
2 Transport device
4 Heating device
5 Individual chain link
10 Preform
12 Preform mouth
13 Support ring
14 Body section
16 Gap
17 Guide means
18 Feeder device, feeder or guide rail
18a,b Rail elements
19 Cylinder
20 Blocking finger, blocking device
21 Ejecting device
22 Separating device, sawtooth star wheel
23 Holding down device
24 Enclosure
26 First surface
28 Second surface
30 Cylinder valve unit
32 Cylinder
34 Valve, magnet valve
36 Magnetic coil
38 Ventilation
40 Pneumatic supply line
40a Pneumatic supply line (for cylinder valve unit 30)
42, 44 Heating elements
46 Deflection means
52 Transfer star wheel
60 Central signal processing unit, CPU
62 Separate output card
64 Bus system, PROFINET bus system
65 Bus system, ASI module
66 Central distribution unit, ASI valve terminal
P Transport path
A. B Heating sections
X Longitudinal axis of the preform

What is claimed is:

1. A device for transporting plastic preforms to a stretch blow molding machine comprising a feeder device, which transports the plastic preforms to a separating device, which is arranged in transport direction upstream of the stretch blow molding machine, a central distribution unit coupled to a main pneumatic supply line and comprising at least two valves, the central distribution unit configured to control actuation the at least two valves via compressed air from the main pneumatic supply line, wherein the feeder device comprises a pneumatically actuable blocking device, which in a first position deblocks the path of transport for the plastic preforms and in a second position blocks the path of transport for the plastic preforms, and wherein the blocking device is actuable by means of a cylinder, characterized in that a cylinder valve for controlling the cylinder is arranged in the immediate vicinity of the cylinder and the cylinder valve is coupled to a decentralized pneumatic supply line that branches from the main supply line prior to the central distribution unit.

2. The device as recited in claim 1, characterized in that a pneumatic connection is provided between the cylinder and the valve, which pneumatic connection is shorter than 30 centimeters.

3. The device as recited in claim 1, characterized in that the feeder device supports the plastic preforms in the process of guiding them, and characterized in that the blocking device is arranged on that side of the feeder device on which it is possible to create a larger gap between two consecutive preforms when the blocking device is inserted between these two preforms.

4. The device as recited in claim 1, characterized in that central signal processing unit is directly connected with the cylinder valve via a bus system.

5. The device as recited in claim 1, characterized in that the central signal processing unit is equipped with a separate output card, which is directly connected to the cylinder valve via a connection means.

6. The device as recited in claim 1, wherein the feeder device comprises at least two surfaces, wherein the first surface guides the plastic preform in a hanging position and the second surface supports the plastic preform from the side, and said device further comprising an actuable blocking device, which in a first position deblocks the path of transport for the plastic preforms and in a second position blocks the path of transport for the plastic preforms, characterized in that the blocking device is arranged in a position below the first surface of the feeder device.

7. A system comprising:
a plurality of plastic performs, each comprising a mouth section and a body section wherein at least a portion of the body section is narrower than the mouth section;
a device for transporting plastic preforms to a stretch blow molding machine comprising a feeder device, which transports the plastic preforms, to a separating device, which is arranged in transport direction upstream of the stretch blow molding machine, wherein the feeder device comprises an actuable blocking device, which in a first position deblocks the path of transport for the plastic preforms and in a second position blocks the path of transport for the plastic preforms, characterized in that the blocking device is aligned to be inserted between two consecutive preforms in the area of the preform body sections that is narrower than the mouth sections.

8. The system as recited in claim 7, characterized in that the blocking device is actuable pneumatically or electrically.

9. The system as recited in claim 7, wherein the blocking device is actuable by means of a cylinder, characterized in that a cylinder valve for controlling the cylinder is arranged in the immediate vicinity of the cylinder and the cylinder valve is coupled to a decentralized pneumatic supply line that branches from the main supply line prior to a central distribution unit.

10. The system as recited in claim 9, characterized in that a pneumatic connection is provided between the cylinder and cylinder valve, wherein the pneumatic connection is shorter than 30 centimeters.

11. The system recited in claim 9, characterized in that a central signal processing unit is directly connected with the cylinder valve via a bus system.

12. The system recited in claim 9, characterized in that a central signal processing unit is equipped with a separate output card, which is directly connected to the cylinder valve via a connection means.

13. A method for transporting plastic preforms having a mouth section and a body section, wherein at least a portion of the body section is narrower than the mouth section, to a stretch blow molding machine wherein the plastic preforms are transported by a feeder device along a transport path to a separating device, said method further involving a blocking device that is switched from a first position for deblocking the transport path to a second position for blocking the transport path, characterized in that a signal for actuating the blocking device is conveyed from a central signal processing unit directly to a valve via a bus system or via a connection means connected to a separate output card, wherein the blocking device is arranged in a position below the feeder device and aligned so that it is inserted between two consecutive preforms in the area of the preform body sections that is narrower than the mouth sections.

14. The method of claim 13, wherein the blocking device is switched by means of a cylinder, characterized in that a cylinder valve for controlling the cylinder is arranged in the immediate vicinity of the cylinder and the cylinder valve is coupled to a decentralized pneumatic supply line that branches from the main supply line prior to a central distribution unit.

15. The method of claim 14, wherein the cylinder valve and the cylinder have a pneumatic connection that is shorter than 30 centimeters.

* * * * *